US006816921B2

(12) United States Patent
Jahnke et al.

(10) Patent No.: US 6,816,921 B2
(45) Date of Patent: Nov. 9, 2004

(54) MICRO-CONTROLLER DIRECT MEMORY ACCESS (DMA) OPERATION WITH ADJUSTABLE WORD SIZE TRANSFERS AND ADDRESS ALIGNMENT/ INCREMENTING

(75) Inventors: Steven R. Jahnke, Tokyo (JP); Hiromichi Hamakawa, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 286 days.

(21) Appl. No.: 09/932,135

(22) Filed: Aug. 17, 2001

(65) Prior Publication Data

US 2002/0062408 A1 May 23, 2002

Related U.S. Application Data

(60) Provisional application No. 60/231,383, filed on Sep. 8, 2000.

(51) Int. Cl.[7] .............................................. G06F 13/22
(52) U.S. Cl. .......................................... 710/22; 710/28
(58) Field of Search ..................................... 710/22–28

(56) References Cited

U.S. PATENT DOCUMENTS

| | | | | |
|---|---|---|---|---|
| 4,644,463 A | * | 2/1987 | Hotchkin et al. | 710/57 |
| 5,297,242 A | * | 3/1994 | Miki | 710/22 |
| 5,754,884 A | * | 5/1998 | Swanstrom | 710/22 |
| 6,115,767 A | * | 9/2000 | Hashimoto et al. | 710/107 |
| 6,385,670 B1 | * | 5/2002 | Spilo et al. | 710/26 |

FOREIGN PATENT DOCUMENTS

| | | |
|---|---|---|
| EP | 0 432 799 A | 6/1991 |
| WO | WO 99 63447 A | 12/1999 |

OTHER PUBLICATIONS

IBM Technical Disclosure Bulletin, *Direct Memory Access Controller*, vol. 26, No. 10A, Mar. 1, 1984, entire document.

D. Flynn; AMBA: *Enabling Reusable On–Chip Designs*, IEEE Micro, IEEE Inc., New York, NY, US; vol. 17, No. 4, Jul. 1, 1997, entire document.

* cited by examiner

*Primary Examiner*—Fritz Fleming
*Assistant Examiner*—David Martinez
(74) *Attorney, Agent, or Firm*—Robert D. Marshall, Jr.; W. James Brady, III; Frederick J. Telecky, Jr.

(57) ABSTRACT

A micro-controller direct memory access (DMA) unit includes hardware support for single read of the source address at a source word size and but writes to the target address at an independent target word size. This permits, for example, a single read of the source address at a larger word size and multiple sub-word sized writes to the target address. This is enabled by independent control register storage of a source word size, a source increment size, a target word size and a target increment size. A byte shifter/register that will shifts a full byte at a time to the next lower byte position allowing transfer of a large word to a destination having a small word size.

11 Claims, 4 Drawing Sheets

MICRO-CONTROLLER DIRECT MEMORY ACCESS (DMA) OPERATION WITH ADJUSTABLE WORD SIZE TRANSFERS AND ADDRESS ALIGNMENT/INCREMENTING

This application claims priority under 35 USC §119(e)(1) of Provisional Application No. 60/231,383, filed Sep. 8, 2000.

TECHNICAL FIELD OF THE INVENTION

The technical field of this invention is data transfer and data bus systems within computer systems.

BACKGROUND OF THE INVENTION

As computer systems have grown more complex, it has become common to employ multiple processors and a wide variety of peripheral devices to transfer data within a chip and from the chip to external devices and vice versa. Such systems almost always have a multiple set of busses separating, for convenience and performance reasons, the communication between similar devices. Multiple bus systems must provide bus controllers to allow for coherent and collision-free communication between separate buses. Micro-controllers are used for this purpose and they provide bus arbitration which determines, at a given time, which device has control of the bus in question.

A prominent standard bus system has emerged for high performance micro-controller designs. The 'Advanced Micro-controller Bus Architecture System' AMBA has been defined by Advanced RISC Machines (ARM) Ltd. (Cambridge, U.K.) and is described in U.S. Pat. No. 5,740,461, dated Apr. 14, 1998. Computer systems of a CISC variety are complex instruction set computers and have total backward compatibility requirements over all versions. RISC (reduced instruction set computer) systems, by contrast, are designed to have simple instruction sets and maximized efficiency of operation. Complex operations are accomplished in RISC machines as well, but they are achieved by using combinations of simple instructions. The RISC machines of ARM Ltd. forming the AMBA architecture are of primary interest here.

The standard AMBA has two main busses, a high performance AHB bus and a peripheral bus APB of more moderate performance. The AHB bus is the main memory bus and contains RAM and an external memory controller. In this basic system definition, if a high performance peripheral is required that will transfer large amounts of data, this peripheral is also placed on the high performance AHB bus. This decreases system performance, however, because the central processor unit (CPU) cannot have access to memory when the peripheral has control of the bus.

Advanced RISC Machines Ltd (ARM) has proposed an efficient arbitration scheme and split transfers to allow the CPU and the high performance peripheral to share bus time of the single AHB bus. ARM has also proposed use of a second bus for isolation and using a single arbiter. This proposal still allows only one transaction to progress at a given time period.

The micro-controller DMA of this invention is a general-purpose DMA that is applicable to a wide range of applications. Its major use is to facilitate the rapid transfer of data from one memory location to another with minimal or no CPU overhead. While the micro-controller DMA is moving data, it is possible for the CPU to continue to execute instructions from program memory. This will enable a higher performance system, since the micro-controller DMA relives the CPU of simply moving data.

The DMA is generally used for moving data from a peripheral data register (or buffer) into the system-level RAM. It may also transfer data stored in RAM to the peripheral. Since the system RAM also holds the variables representing the peripheral data, once the micro-controller DMA has moved the data from the peripheral to the RAM, the CPU does not need to access the peripheral to get the updated data. This increases performance in two ways:

1. The CPU does not need to do a load and then store of the data. Only a single load from RAM will suffice.
2. It is more cycle efficient to access the system RAM than the peripheral data registers. In the AMBA system, the AHB bus where data RAM is located, is generally a zero-wait pipelined bus. The APB bus, where most of the peripherals are located, generally requires at least two wait states. The DMA controller relieves the CPU of both the wait-states to the APB bus and in the CPU store operation.

In some bus standards, certain components have a fixed address length defined (such as 32-bits for the APB component of the AMBA) while another part will allow multiple address lengths (such as AHB component of AMBA supporting multiple bus sizes). However, the actual word size of the register may be smaller (such as the 8-bit or 16-bit register in a bus defined for 32-bits) than the fixed address length simply by incrementing by the word size of the register will result in an incorrect address because the address length is fixed at a larger size. The DMA controller needs to support both the variable address length such as in the AHB bus and the fixed address length such as in the APB bus.

SUMMARY OF THE INVENTION

In this invention, a micro-controller DMA is described which includes hardware support for a number of unique features including:

1. Single read of the source address at the larger word size, while permitting multiple sub-word sized writes to the target address.
2. Four sets of control bits are provided. Two sets are for the source address including source word size and source increment size. Two sets are for the target address including target word size and target increment size.
3. A byte shifter/register that will shift a full byte at a time to the next lower byte position allows transfer of a larger word (such as a 16-bit or 32-bit sized word) to a destination having a smaller word size (such as 8-bits or 16 bits).

The above features allow the programmer to set both the actual word size of the source and destination locations and allow the programmer to also set the size to increment. On a fixed bus system such as the APB bus this value can be set to the fixed size. On a variable word-sized system, this can be set to be whatever the current peripheral supports. Completely separate software programmable word size and increment size for both the source and the destination addresses is provided. The address increment size is not dependent upon the word size of the transfer.

The user has complete control over how the micro-controller DMA handles the data and how the address is incremented. All the actual work is still done in hardware so no additional software overhead is required. However, the same micro-controller DMA can now be used to transfer data in a system with different bus standards, such as AMBA having AHB and APB, without compromising efficiency, limiting peripheral or bus efficiency, such as by fixing the sizes of the transfer or unduly burdening the CPU to translate word sizes.

BRIEF DESCRIPTION OF THE DRAWINGS

These and other aspects of this invention are illustrated in the drawings, in which.

DETAILED DESCRIPTION OF PREFERRED EMBODIMENTS

The multiple transaction advanced high performance bus system (MTAHB) of this invention is used as an upgrade to the micro-controller bus architecture (AMBA) of Advanced RISC Machines Ltd. (ARM). The AMBA machines use RISC processors which are identified by the name ARM processors. Advanced RISC Machines Ltd. (Cambridge, U.K.) has been awarded U.S. Pat. No. 5,740,461, dated Apr. 14, 1998 in which this class of machines is fully described. The techniques used in this invention are of wider applicability, as will be shown, and can be used in a variety of multi-processor systems having multiple bus architectures.

Figure 1:
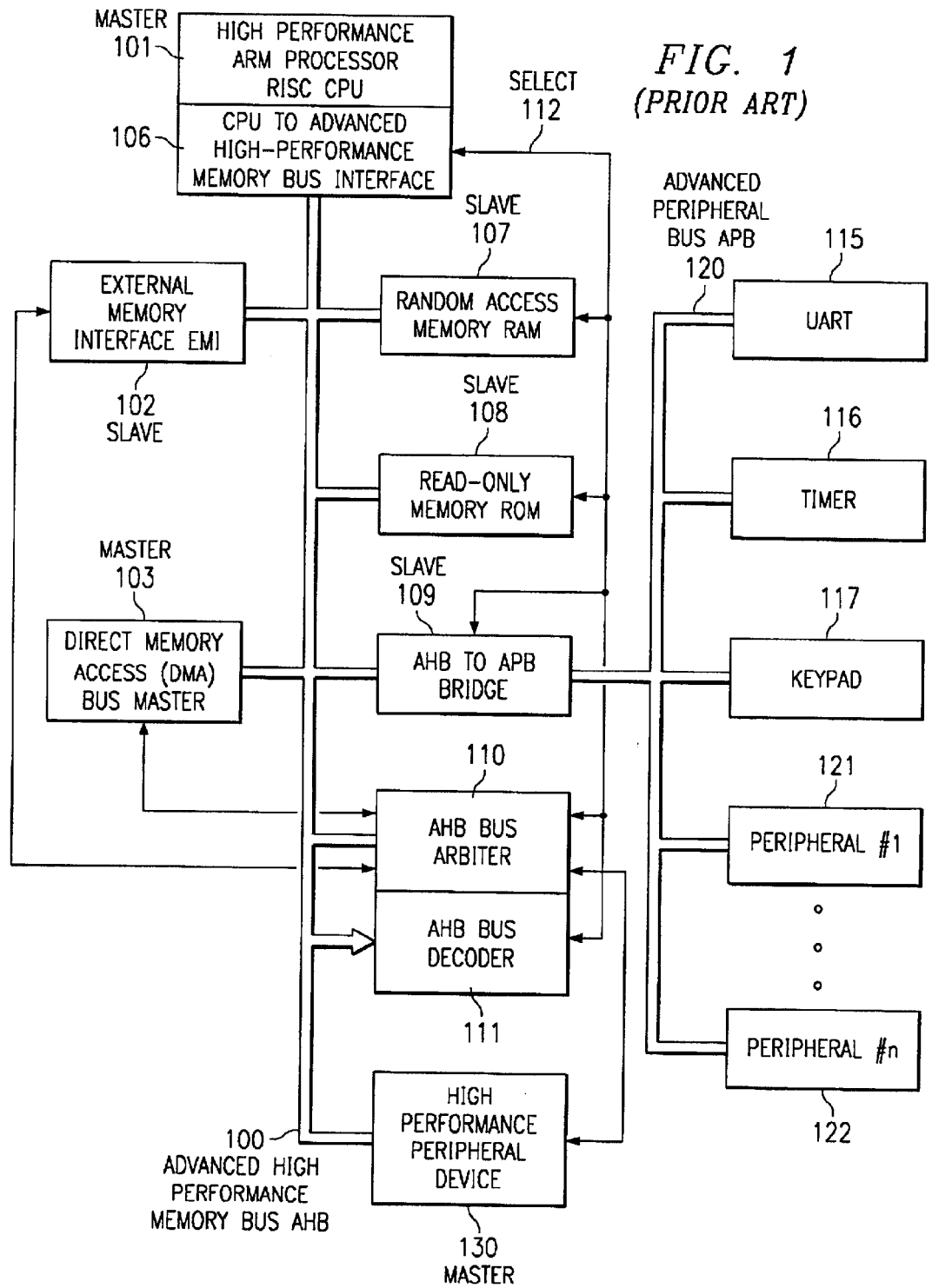
FIG. 1 illustrates the block diagram of a prior art advanced micro-controller bus architecture AMBA having a conventional AHB bus system.

FIG. 1 illustrates the AMBA standard. The AMBA has two main busses, an advanced high performance bus (AHB) 100 and an advanced peripheral bus (APB) 120 of more moderate performance. AHB bus 100 is the main memory bus and couples to CPU 101 via CPU advanced high performance memory bus interface 106 to random access memory (RAM) 107, read-only memory (ROM) 108 and an external memory interface (EMI) controller 102. FIG. 1 further illustrates a second master device direct memory access (DMA) unit 103 also coupled to AHB bus 100. Arbitration for bus access between the two masters, CPU 101 and DMA 103, takes place in M-bus arbiter 110. M-bus arbiter 110 controls access to the various slave devices via M-bus decoder 111 and select lines 112. In this basic system definition, if a high performance peripheral is required that will transfer large amounts of data, this peripheral is also placed on the high performance AHB bus 100. FIG. 1 illustrates such a high performance peripheral device 130. Placing this high performance peripheral device 130 on AHB bus 100 decreases system performance, because CPU 101 and DMA 103 cannot have access to memory when high performance peripheral device 130 has control of AHB bus 100. ARM has proposed an efficient arbitration scheme and split transfers to allow the CPU 101, DMA 103 and the high performance peripheral 130 to share bus time of the single AHB bus 100.

ARM has also proposed use of a second bus for isolation and using a single arbiter. As shown in FIG. 1, this second bus is called the advanced peripheral bus (APB) 120. APB bus 120 operates in the same fashion as AHB bus 100. APB bus 120 is connected to AHB bus 100 via an AHB-to-APB bus bridge 109. AHB-to-APB bus bridge 109 is a slave to AHB bus 100. The two bus system with single M-bus arbiter 110 is of limited usefulness, because it allows only one transaction to progress at a given time period. Note that all high performance devices including memory and high performance peripheral device 130 are on AHB bus 100. All peripheral devices of moderate performance including UART 115, timer 116, keypad 117 as well as peripherals 121 to 122 reside on the peripheral bus 120.

Figure 2:
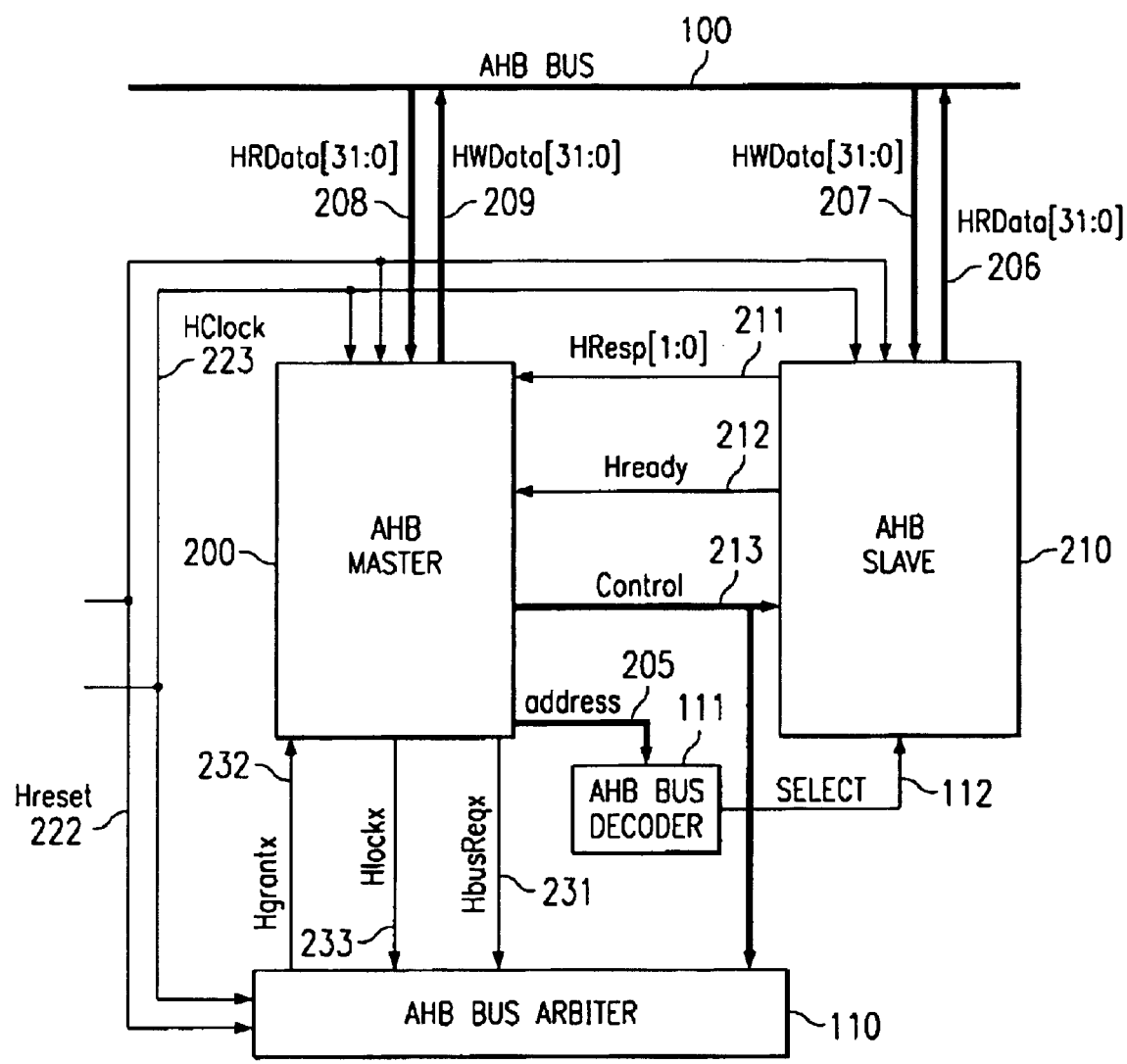
FIG. 2 illustrates the signal interconnections of a prior art single master, slave and arbiter combination in the AMBA architecture.

FIG. 2 illustrates the signal flow between a master requesting control of the AHB bus, the arbiter performing the arbitration decision and the slave selected by the master for a command to be executed in this standard AMBA system. AHB bus arbiter 111, AHB master 200 and AHB slave 210 each receive a reset signal HReset 222 and a clock signal HClock 223. The AHB master 200 makes the request of AHB arbiter 110 by activating HBusReqx signal 231. The AHB master 200 receives permission from AHB arbiter 110 by HGrantx signal 232. The AHB master 200 confirms the grant and locks this arbitration decision by HLockx signal 233. AHB master 200 then sends address 205 to AHB decoder 111. AHB decoder 111 activates a select signal 112 supplied to the selected slave device. In this example the selected slave device is AHB slave 210. The interacton of AHB master 200 and AHB slave 210 is completed via the control signals 213 and acknowledged via HResp signal 211 and HReady signal 212. Data for read and write operations flows between all masters and all slaves via the AHB bus 100. AHB slave 210 supplies data to AHB bus 100 via HRData[31:0] bus 206 and receives data from HB bus 100 via HWData[31:0] bus 207. Likewise, AHB master 200 receives data from AHB bus 100 via HRData[31:0] bus 208 and supplies data to AHB bus 100 via HWData[31:0] bus 209. Note in this regard that reads and writes are considered from the point of view of AHB aster 200. Thus in a data read data flows from AHB slave 210 to AHB bus 100 via HRData[31:0] bus 206 and from AHB bus 100 via HRData[31:0] bus 208. Of course only one master is activated at a give time and this master selects only one slave with which it will execute a transfer (read or write) command.

Direct memory access units (DMA) can increase system performance by relieving the central processing unit (CPU) of the overhead associated with transferring of data from the peripherals to the data RAM. This reduces CPU overhead in two ways. First, and most obviously, since the CPU does not need to run code associated with the data movement (usually a 'LOAD' from one memory location and a 'STORE' to another on a load-store architecture), the CPU has some cycles free to continue with its main task. Second, the peripherals are generally on a slower, wait state bus. While performing the load-store operation, the CPU would also have to wait the same number of wait states. With DMA, only the DMA controller has to wait, thereby freeing those cycles for other CPU tasks.

Figure 3:
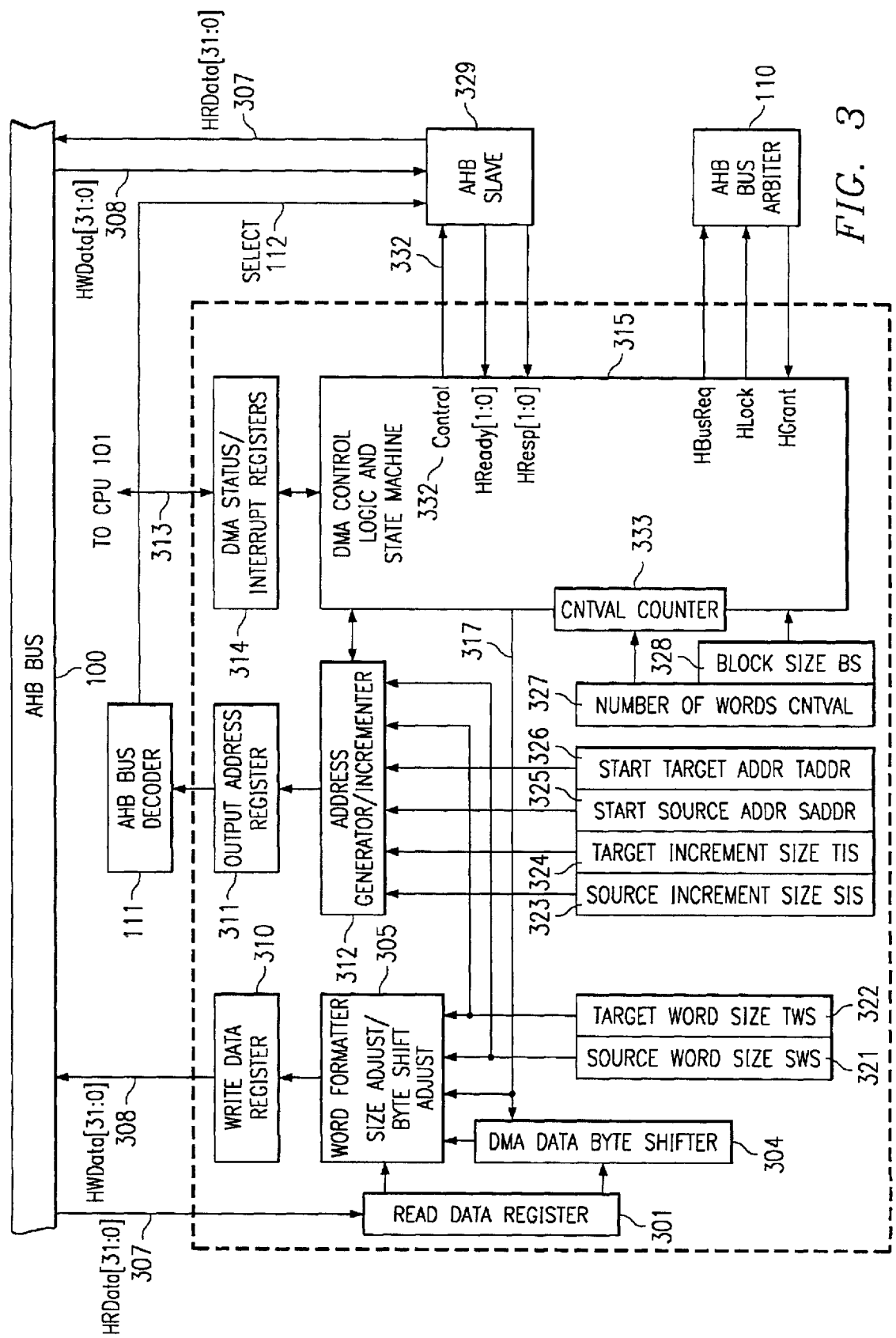
FIG. 3 illustrates the block diagram of the micro-controller DMA of this invention.

FIG. 3 illustrates the elements of the micro-controller DMA of this invention in detail. DMA control registers 321 through 328 store all information pertaining to the transfer. Register block 314 contains DMA status register DMAST and block interrupt register BI. The source and target word size, block size, source and target increment size, starting source address and starting target address must be derived from the respective control registers 321 to 328 before an transfer can begin.

The number of words to transfer (length of transfer) is determined by the value in the counter value (CNTVAL) register 327 and is loaded into CNTVAL counter 333 within the DMA control logic block 315. The size of each block is derived from the block size value stored in the BS register 328. The starting source address is stored SADDR register 325 and the starting target address is stored in TADDR register 326.

In actual implementations, control registers 321 to 328 are often placed on the APB bus to facilitate chip configuration by loading these registers. In these implementations the micro-controller DMA retrieves a copy of the control register contents as required by normal data transfers from the APB bus.

The requirement for word size adjustment across the AHB/APB boundary may be summarized as follows. APB bus 120 is always a 32-bit bus and supports only 32-bit accesses. On the other hand, AHB bus 100 supports data types of 8-bit, 16-bit, or 32-bits. For a micro-controller DMA to write data from an APB bus peripheral to a device on AHB bus 100, it must always transfer and store 32-bit words even if APB bus 120 has only an 8-bit or 16-bit data register.

Two programmable registers are provided that allow the user to select the word sizes. The SWS register 321 sets the source word size. The TWS register 322 sets the target word size. The micro-controller DMA then may read data from the source as defined by the source word size SWS register 321, but write data to the target location as defined by the target word size TWS register 322.

The micro-controller DMA aligns data in the memory to the most efficient memory size available. The micro-controller DMA with its programmable target word size, may also guarantee 32-bit transfers to the APB peripheral if the data to be transferred is only a word or a half-word.

The two main benefits of the technique of this invention are:

1. On a transfer from memory to APB Bus 120, 32-bit accesses must be made to the APB peripheral. If the application program is storing data on byte or half-word boundaries in memory, the DMA must convert the boundary to be full-word aligned. With programmable source word size and target word size, the micro-controller DMA can read data on sub-word size boundaries but write data as full words.
2. On storing data from the APB peripheral to memory, data must always be read as a full word from the APB memory space, but not all data occupies a full word. The micro-controller DMA can more efficiently pack the APB data into memory at the desired word size by programming the target word size to the desired width (8-bits, 16-bits or 32-bits). This allows the application program to use sub-word sized data types in its source code (e.g. byte or char) and read the correct data directly from the memory without having to resize the words in software.

The data transfer process starts with data being stored in the read data register 301. The DMA control logic 315 sends commands to the address generator/incrementer 312, data byte shifter 304 and word formatter 305 setting all multiplexing and register functions in the mode required for the next desired transfer or next partial transfer. The write data register 310 and output address register 311 hold the content of data and address words needed for the next operation.

A complete DMA transfer is done when CNTVAL counter 333 counts down to 0x0000. Each word transferred, having a size determined by the SWS register 321, will cause CNTVAL counter 333 to decrement by one. Upon reaching 0x0000, the corresponding DMA status bit is set in DMA status register DMAST and a block interrupt is generated via block interrupt register BI, both a part OF DMA status/interrupt register block 314.

The DMA has the option of breaking the entire transfer into a variable number of blocks. A block size of 'one' indicates that the DMA will transfer only one word at a time. However, certain memory types, such as SDRAM, allow for burst transfers during which the memory locations must be read in consecutively. Blocks may also be useful to take advantage of the AHB pipeline or to prevent the one-cycle penalty on non-consecutive accesses. The DMA will hold AHB bus 100 for the entire block transfer length.

DMA control logic 315 generates control signals based on data from the control registers 321 through 328 which hold the parameters for a complete transfer. CNTVAL counter 333 is initialized with the programmed number of words for the transfer stored in CNTVAL register 327. The output address register 311 is initialized to the starting addresses. These are the source start address stored in SADDR register 325 and the target start address stored in TADDR register 326. The current address stored in the output address register 311 is initialized to the SADDR and TADDR starting addressed and is updated by incrementing the addresses on completion of a word transfer.

Figure 4:
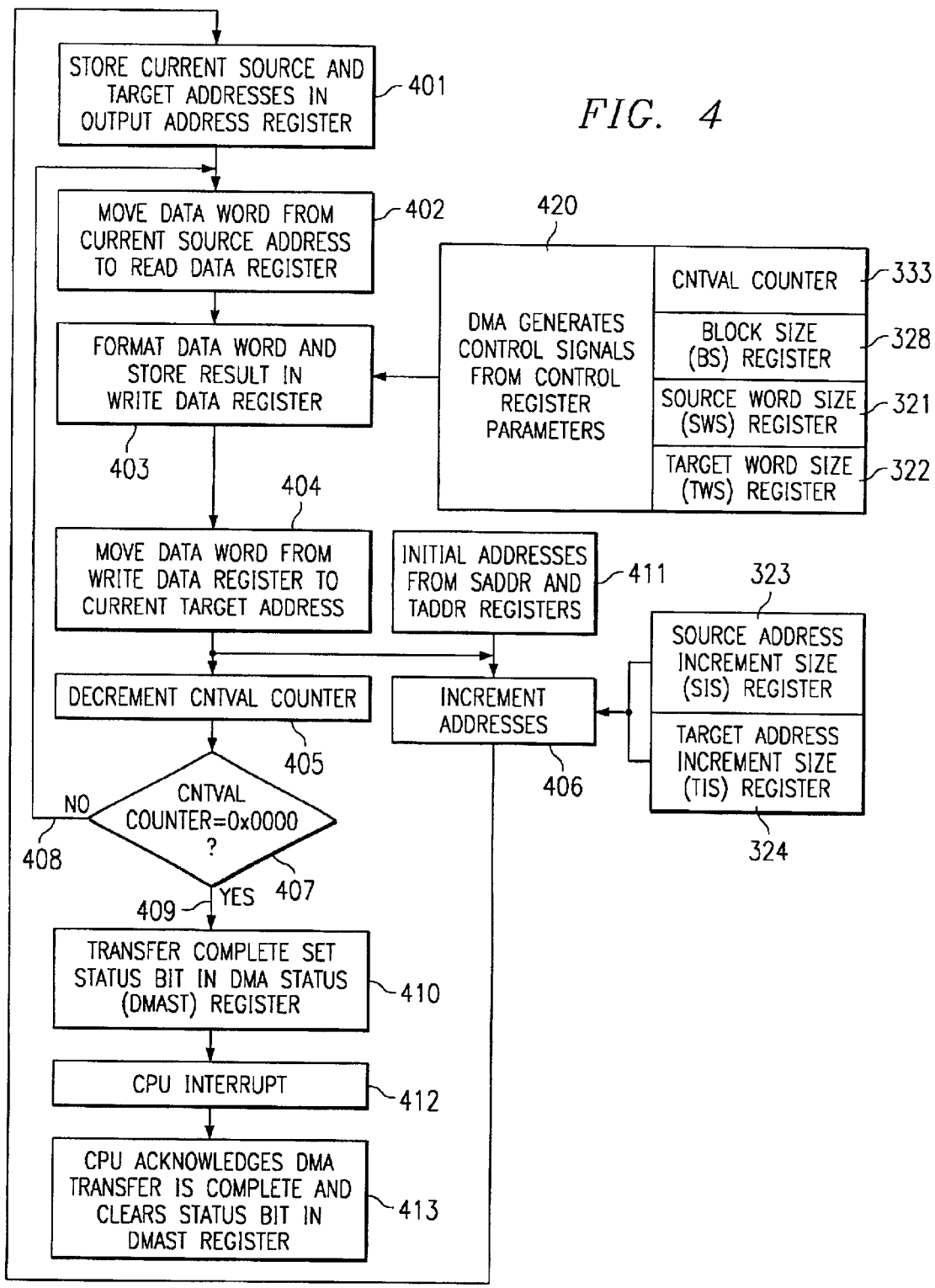
FIG. 4 illustrates the micro-controller DMA transfer flow with adjustable word size transfers and address alignment/incrementing.

FIG. 4 illustrates a flow chart of the DMA transfer process. The current source and target addresses are stored in the output address registers 311 (processing block 401). Next, the data word stored at the source address is moved to the DMA read data register 301 (processing block 402).

Next, the data is formatted using size adjust or byte-shift adjust in word formatter 305 and result is stored in write data register 310 (processing block 403). This process will normally take multiple clock cycles. As illustrated in FIG. 4, this process involves DMA general control signals 420 including CNTVAL register 333, block size register BS 328, source word size register SWS 321, target word size register TWS 322, source address increment size register SIS 323 and target address increment size register TIS 324. With regard to source word size SWS register 321 and target word size register TWS 322, both may be set to 8-bit, 16-bit or 32-bit word sizes. If a source address is selected that contains a word larger than that allocated at the target address, then the target receives the larger data word, but these are carried out multiple smaller word sized writes.

For example, if a 16-bit data register in one peripheral needs to send the full 16 bits to another peripheral which has only an 8-bit data register, the micro-controller DMA will read the source address once, but will create multiple writes to the target address. A 16-bit source peripheral writing to an 8-bit target peripheral will make one read from the 16-bit source, but two writes to the 8-bit target address incremented as required. A transfer from a 32-bit source peripheral will result in two writes to a 16-bit target peripheral or four writes to an 8-bit target peripheral.

Regarding DMA data byte shifter 304, consider the transfer of a larger word such as 32-bit word to a destination having a smaller word size such as 8-bits. In this type of operation multiple writes need to be made to the destination. On the first clock, the lower byte or half word needs to be aligned to the lower byte or half word in order to be transferred to the destination. On the next clock, byte 2 is written, byte 3 moves to byte 1 position etc. When all, four bytes are written, micro-controller DMA can make the next read from the 32-bit source location and repeat the process. With 32-bit registers in both the read data register 301 and the write data register 310, the micro-controller DMA has sufficient flexibility through its control outputs 332 to slave devices to implement the multiple writes required for the full range of total and partial data transfers required.

The above features allow the programmer to set both the actual word size of the source and destination locations and allow the programmer to also set the size to increment. On a fixed bus system like APB bus 120 this value can be set to the fixed size. On a variable word-sized system, this can be set to be whatever the current peripheral supports. Completely separate software programmable word size and increment size for both the source and the destination addresses is provided. The address increment size is not dependent upon the word size of the transfer.

The user has complete control over how the microcontroller DMA handles the data and how the address is incremented. All the actual work is still done in hardware so no additional software overhead is required. However, the same micro-controller DMA can now be used to transfer data in a system with different bus standards, such as AMBA having AHB bus 110 and APB bus 120, without compromising efficiency, limiting peripheral or bus efficiency by fixing the sizes of the transfer or unduly burdening the CPU to translate word sizes.

To complete the word transfer the data word is then moved from the write data register to the current target address location (processing block 404). As each word is transferred CNTAL counter 333 decrements by one (processing block 405).

CNTVAL counter 333 is examined to determine it is hexadecimal zero (0x0000) (decision block 408). If DMA data transfer has not completed the entire DMA transfer yet (no branch 408), that is CNTVAL counter 333 has not yet reached 0x0000, then the DMA controller will execute the next word of the transfer. The initial source and target addresses (block 411) are incremented processing block 406). These addresses are initialized according to start source address register SADDR 325 and start target address register TADDR 326. The source address is incremented by the value stored in source address increment size register SIS 323 and he target address is incremented by the value stored in target increment size register TIS 324.

If, the DMA has completed the entire transfer and CNTVAL counter 333 has reached 0x0000 (yes branch 409), then the transfer complete status bit in the DMAST register will be set (processing block 410). The DMA will then generate a CPU interrupt (processing block 412), requiring the CPU to acknowledge completion of the DMA data transfer (processing block 413). On doing so the CPU will clear the DMAST status and allow for additional DMA transfer action.

The next DMA request will initiate a new transfer of data from address register SADDR to the address in address register (TADDR) repeating the process steps illustrated in FIG. 4

The following is a list of the control registers and bits that control and display the state of the DMA controller. There is a complete set of register resources for each independent channel of the DMA. The preferred embodiment includes 32 DMA channels.

Start source address register SADDR 325 stores the start address to move data from for the corresponding DMA channel. This is preferably a full 32-bit address. The following transfer start address may or may not increment by SIS[1:0], depending upon the value programmed at a corresponding address increment select bit IADD (see below). In the preferred embodiment there are 32 separate registers for this function, one complete 32-bit register for each of 32 DMA channels.

Start target address register TADDR 326 stores the destination address to move data to for the corresponding DMA channel. This is preferably a full 32-bit address. The value stored here is the target address for the destination location. On each successive transfer of data from the start address, the target address will selectively increment by the corresponding TIS[1:0] depending on the state of the corresponding TIADD bit, until the transfer is complete, that is when the corresponding CNTVAL register 333 becomes 0x0000. In the preferred embodiment, there are 32 separate registers for this function, one complete 32-bit register for each of 32 DMA channels.

Source word size register SWS 321 stores the actual size of the word read for the corresponding DMA channel. Two bits SWS[1:0] are required for each DMA channel. The bits SWS[1:0] are coded as follows:

TABLE 1

| SWS[1:0] | Word Size |
|---|---|
| 0 0 | 8 bits |
| 0 1 | 16 bits |
| 1 0 | 32 bits |
| 1 1 | Reserved |

Target word size register TWS 322 stores the actual size of the word to be written for the corresponding DMA channel. Two bits TWS[1:0] are required for each DMA channel. The bits TWS[1:0] are coded as follows:

TABLE 2

| TWS[1:0] | Word Size |
|---|---|
| 0 0 | 8 bits |
| 0 1 | 16 bits |
| 1 0 | 32 bits |
| 1 1 | Reserved |

Number of words count register CNTVAL[15:0] 333 stores the a value to count the number of DMA transactions before causing a DMA Status (DMAST) event. When the contents of this register reach 0x0000, the corresponding DMAST bit will be active.

DMA block size register BS 328 stores the value of the number of consecutive DMA accesses to make. When a DMA request is made, the DMA controller will transfer the number of words programmed in this register immediately without interruption. During a block transfer, the DMA controller will not release control of AHB bus 100. Note that the value of block size register BS 328 is independent of the count value stored in CNTVAL register 327 and of the current value of CNTVAL counter 333. Upon completion of transfer of the block size of data, a new arbitration takes place on AHB bus 100. If the block size is less than the count value, a long DMA transfer can be interrupted upon completion of each transfer of the block size by a higher priority request or a different pending request in a round robin priority.

Source increment size register SIS 323 stores the address increment size for the start address during a word transfer for the corresponding DMA channel. Two bits SIS[1:0] are required for each DMA channel. The bits SIS[1:0] are coded as follows:

TABLE 3

| SIS[1:0] | Word Size |
|---|---|
| 0 0 | 8 bits |
| 0 1 | 16 bits |
| 1 0 | 32 bits |
| 1 1 | Reserved |

Target increment size register TIS 324 stores the address increment size for the target address during a transfer for the corresponding DMA channel. Two bits TIS[1:0] are required for each DMA channel. The bits TIS[1:0] are coded as follows:

TABLE 4

| TIS[1:0] | Word Size |
|---|---|
| 0 0 | 8 bits |
| 0 1 | 16 bits |
| 1 0 | 32 bits |
| 1 1 | Reserved |

The following registers are a part of DMA status/interrupt register block 314: block interrupt register BI; block interrupt enable register BIE; DMA status register DMAST; source address increment select register SIADD; and target address increment select register TIADD. Each of these registers includes a single bit corresponding to each DMA channel. The coding of these bits is listed in Table 5.

TABLE 5

| Mnemonic | Definition |
|---|---|
| BI | Block Interrupt<br>When active, indicates a DMA transfer complete<br>0 = DMA not finished<br>1 = DMA finished |
| BEI | Block Interrupt Enable<br>Selectively enables a CPU interrupt based on a corresponding block interrupt bit BI<br>0 = Interrupt enabled<br>1 = Interrupt disabled |
| DMAST | DMA Status bit<br>Completion status of corresponding DMA transfer<br>0 = DMA channel not finished<br>1 = DMA channel finished |
| SIADD | Source Address Increment Select<br>Selects increment of the source address<br>0 = No increment<br>1 = Increment by source increment size SIS |
| TIADD | Target Address Increment Select<br>Selects increment of the target address<br>0 = No increment<br>1 = Increment by source increment size TIS |

Block interrupt bit BI indicates whether a DMA block transfer has completed and the DMA controller has finished moving the number of words programmed in the corresponding BS register 328. If the corresponding BIE bit is also set, an interrupt will be generated back to CPU 101. Software must clear this flag after a block transfer, no hardware resets this bit. Cooperation of both the block interrupt bit BI and the corresponding block interrupt enable bit BIE is required to generate a CPU interrupt at the end of a DMA data transfer. DMA Status bit DMAST is "0" if no corresponding DMA request has been made, or if there is a pending DMA request and the transfer has not finished. This bit must be reset by software, no hardware resets this bit.

What is claimed is:

1. A data transfer system comprising:

a plurality of bus devices, at least one bus device being a bus data supplying device capable of supplying data, a least one bus device being a bus data receiving device capable of receiving data and at least one bus device being a bus master device capable of requesting and controlling data transfer;

a data bus connected to each of said plurality of bus devices and capable of transferring data from a bus data supplying device to a bus data receiving device under control of a bus master device;

a direct memory access unit connected to said data bus as a bus master device, said direct memory access unit including a source word size register storing a source word size,
a target word size register storing a target word size,
a source start address register storing a source start address,
a source increment size register storing a source increment size,
a target start address register storing a target start address, and
a target increment size register storing target increment size, said direct memory access unit capable of transferring data from a first bus data supplying device to a first bus data receiving device via said first bus by recalling data from a first bus data supplying device beginning at said source start address and thereafter at successive addresses differing by said source increment size in a data size corresponding to said source word data size and supplying said recalled data to a first bus data receiving device beginning at said target start address and thereafter at successive addresses differing by said target increment size in a data size corresponding to said target word size.

2. The data transfer system of claim 1, wherein:

said direct memory access unit further includes
a read data register loaded with data from said bus data supplying device via said data bus in said source word size,
a write data register supplying data to said bus data receiving device via said data bus in said target word size, and
a word formatter connected to transfer data from said read data register to said write data register thereby aligning data in said target word size in said write data register.

3. The data transfer system of claim 2, further comprising:

at least one first bus device being a first bus supplying/receiving device capable of both supplying data to said first bus and receiving data from said first bus.

4. The data transfer system of claim 3, wherein:

at least one first bus supplying/receiving device consists of
a central Processing unit which is further capable of controlling data transfer.

5. The data transfer system of claim 3, wherein:

at least one first bus supplying/receiving device consists of a direct memory access unit which is further capable of controlling date transfer.

6. The data transfer system of claim 3, wherein:

at least one first bus supplying/receiving device consists of a memory which is not capable of controlling data transfer.

7. The data transfer system of claim 3, wherein:

at least one first bus supplying/receiving device consists of a central processing unit which is further capable of controlling data transfer, said central processing unit connected to said direct memory access unit for loading data into said source data size register and into said target data size register.

8. The data transfer system of claim 1, wherein:

at least one first bus supplying/receiving device consists of a central processing unit which is further capable of controlling data transfer, said central processing unit connected to said direct memory access unit for loading data into said source start address register, said source increment size register storing, said target start address register and said target increment size register.

9. The data transfer system of claim 1, further comprising:

a bus arbiter connected to each of said at least one bus master device, said direct memory access unit and said first bus, said bus arbiter granting control of data transfer on said data bus to one and only one bus master device; and said direct memory access unit further includes a counter value register storing a number of data words to be transferred by said direct memory access unit, a block size register storing a block size to be transmitted without interruption, said direct memory access unit requesting bus control from said bus arbiter and upon grant of control of data transmission on said data bus, said direct memory access unit thereafter transferring data in an amount equal to the lesser of said number of data words to be transferred and said block size to be transmitted without interruption, there after ending data transfer if data transferred equals said number of data words to be transmitted, and suspending data transfer, releasing control of data transfer on said data bus and re-requesting bus control from said bus arbiter.

10. The data transfer System of claim 9, wherein:

at least one first bus supplying/receiving device consists of a central processing unit which is further capable of controlling data transfer, said central processing unit connected to said direct memory access unit for loading data into said counter value register and said block size register.

11. The data transfer system of claim 1, wherein said plurality of bus devices consist of first bus devices and said data bus consists of a first data bus, said data transfer system further comprising:

a plurality of second bus devices, at least one second bus device being a second bus data supplying device cable of supplying data, at least one second bus device being a second bus data receiving device capable of receiving data and at least one second bus device being a second bus master device capable of requesting and controlling data transfer, each second us device having a predetermined data size;

a second data bus having said predetermined data size connected to each of said plurality of second bus devices and capable of transferring data from a second bus data supplying device to a second bus data receiving device under control of a second bus master device;

a bus bridge connected to said first data bus and said second data bus, said bus bridge capable of transferring data between said first bus devices and said second bus devices; and wherein said direct memory access unit stores said predetermined data size in said source word size register for data transfer from a second bus device to a first bus device via said bus bridge and stores said predetermined data size in said target word size register for data transfer from a first bus device to a second bus device via said bus bridge.

* * * * *